Oct. 7, 1952 — O. R. ENGELMANN — 2,612,893
OPTICAL INSTRUMENT
Filed July 5, 1949 — 2 SHEETS—SHEET 1
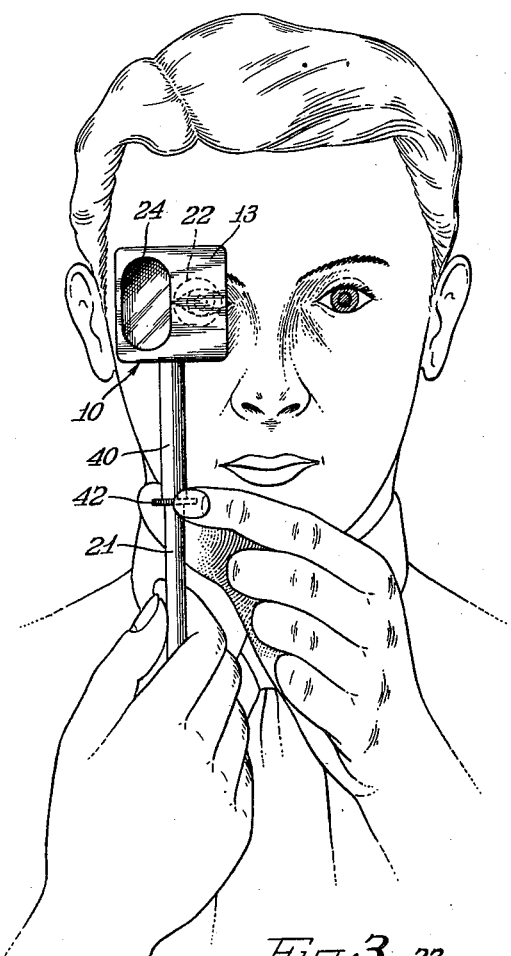
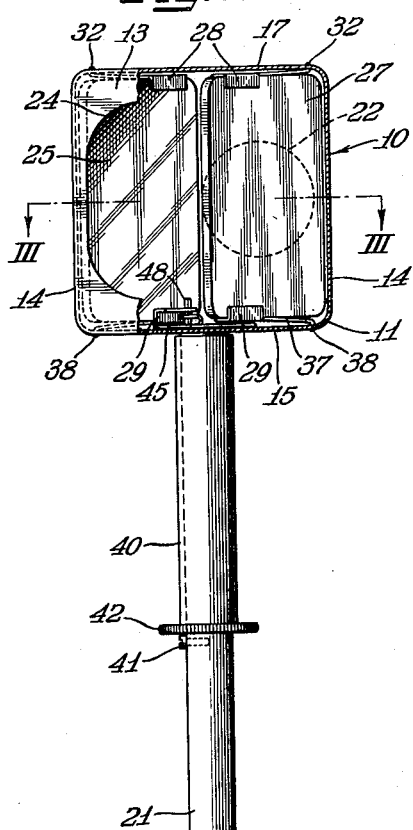
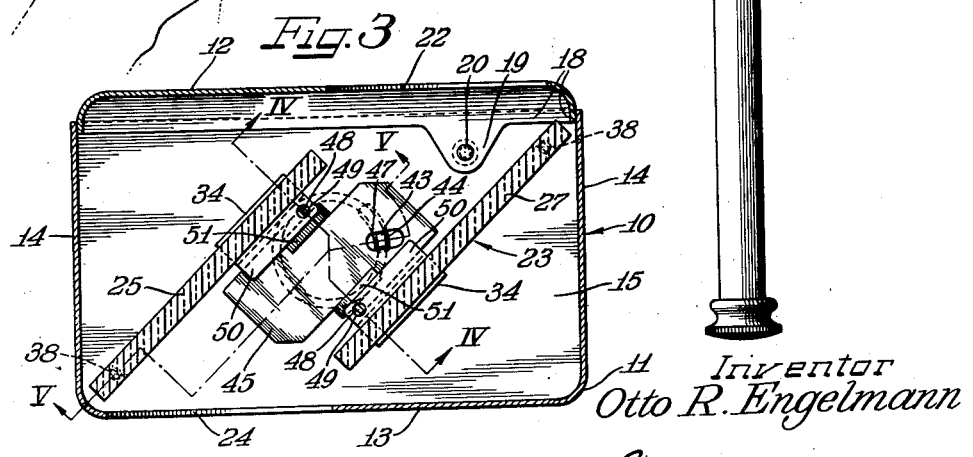
Inventor
Otto R. Engelmann
by The Firm of Charles W. Hills — Attys

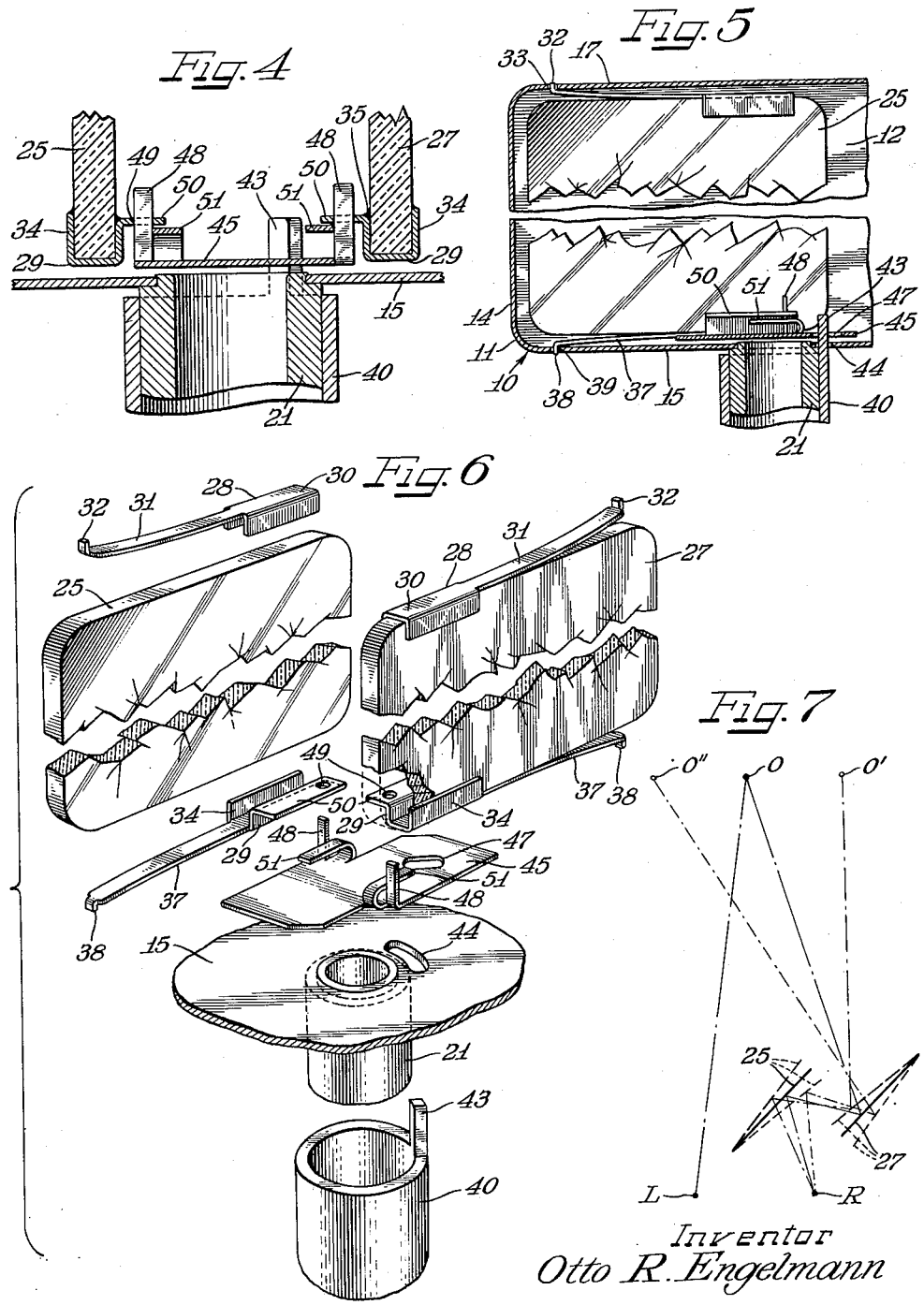

Patented Oct. 7, 1952

2,612,893

UNITED STATES PATENT OFFICE 2,612,893

OPTICAL INSTRUMENT

Otto R. Engelmann, Chicago, Ill.

Application July 5, 1949, Serial No. 103,123

11 Claims. (Cl. 128—76.5)

My invention relates to a hand instrument useful in the producing of visual fusion of the brain images. It is also useful in improving and developing the span and quality of visual fusion, or the ability to have single binocular vision. It further is a means for seeing tri-dimensionally at distances ranging from near to infinity under controlled conditions. It further can be used to fuse and view stereoscopically photographed pictures.

Insofar as I have been able to ascertain there has not heretofore been available an instrumentality satisfactory for hand use; most prior inventions are larger instruments suitable for office use only.

My instrument is one that can be easily carried and used anywhere, the frequency and convenience of its use being a most valuable and important factor in visual training.

Not all persons have normal, stereoscopic vision or vision free from central or peripheral suppression in one or both eyes. Persons engaged in occupations requiring continued near use of the eyes sometimes develop cramped, squinted postures of the eyes which make it difficult to quickly straighten the eyes for seeing in the distance. Again the viewing of stereoscopic pictures or X-ray plates projected on the screen or held in the hand requires special instrumentation.

My instrument provides a means for producing diplopia by separating the visual images in the brain, by moving one of the two visual axes to the right or left of its fellow. The entire excursion of the visual axes from the extreme right to the extreme left produces in the brain a small area in which both axes are sufficiently overlapping to permit visual fusion or single binocular vision.

It is the functioning of this small fusion field which is at times deficient and in need of training, also the responses and relationship between the brain fusion area and the eye muscles may need training. The instrument operates to cause a stimulation and increased action and response to the functions of both the fusion area and the ocular muscles.

In using my instrument as a vision trainer for stimulating the optical nerve processes to correct visual fusion deficiencies, the patient looks at a target freely with one eye while at the same time viewing the same target with the remaining eye through an optical system adjusted to a visual axis correlated to the visual axis of said one eye for effecting fusion in the brain of the image impressions from both eyes. While continuously viewing the object, the optical system is cyclically operated to divert the visual axis therethrough and thus tends to shift from the condition of visual fusion the image as viewed by the eye looking through the optical system. This disturbance or breaking of the image fusion is resisted by the visual sensory nerve centers. After the momentary tendency toward or actual shifting of the image, or breaking of fusion, by said operation of the optical system, the system is operated to readjust the visual axes. As a result of such cyclical operation of the optical system, ocular nerve impulses are generated, the intensity and duration of which are controlled by the extent and frequency of the cyclical operations of the optical system and the extent or divergence effected during the cyclical operations. The ocular nerve impulses stimulate and effect exercise of the ocular muscles and thereby of the higher centers of the brain which are utilized in effecting binocular vision.

The instrument to be described more fully hereinafter affords a means whereby a patient can, after receiving simple instructions, administer his own vision treatment. For this purpose, a small, compact and efficient unit is provided which is adapted to be manufactured and sold at so reasonable a cost that patients requiring extended treatment may purchase the same for their own use, or oculists or optometrists may equip themselves with a number of the instrument units for a short term loan to their patients for use at home for the duration of the prescribed treatment.

In addition to being used as a visual training instrument my instrument can further be used for the viewing of stereoscopically presented pictures, either still, motion or television. To see stereoscopically photographed pictures tri-dimensionally it is only necessary to displace the stereoscopic pictures the width of one frame, thus superimposing the right eye and left eye pictures (making three pictures); the middle picture will be tri-dimensional or stereoscopic.

My primary object is to provide a vision trainer capable of producing a strong stimulus to visual fusion by observation of a selected fixed target, differing from most prior visual training instruments in that they mostly use a moving target against a stationary background, giving the patient a feeling of following a target. With the prior expedients the patient is rarely free from a feeling of near concept, a psycho-somatic sensation which retards, and often stops, the further development of free smooth distance fusion and the normal use of the eyes.

Another object is to provide a means of viewing an entire movable target which can be in flat, printed or tri-dimensional form and which can take the shape of the outdoors or the indoors or any object located in either.

Another object of my invention is to provide a trainer for visual fusion, particularly for cases of squint.

Another object is to provide a trainer for the development of stereoscopic vision at distances ranging from near to infinity.

Another object is to provide a trainer for widening the span of convergence and divergence and the fusion range of vision.

Another object is to provide a viewer for tri-dimensional television, still, and moving pictures at any distance from near to infinity by creating a superimposition of the two pictures in the brain.

Another object is to provide a viewer and/or trainer which may be used for the improvement and correction of the vertical and/or horizontal deviations of the visual axes.

Other objects, features and advantages of the present invention will be readily apparent from the following detailed description of a preferred embodiment thereof taken in conjunction with the accompanying drawings in which:

Figure 1 is a front elevational view of a device according to the present invention showing the same in use by a patient;

Figure 2 is an enlarged front elevational view of the device with the front wall partially broken away for purpose of clarity;

Figure 3 is an enlarged horizontal sectional detailed view taken substantially on the line III—III of Figure 2;

Figure 4 is a fragmentary enlarged vertical sectional view taken substantially on the line IV—IV of Figure 3;

Figure 5 is a fragmental vertical sectional view taken substantially on the line V—V of Figure 3;

Figure 6 is a fragmental exploded perspective view of the internal mechanism of the device revealing various details of structure; and Figure 7 is a diagrammatic view illustrating the method of operation of the instrument.

In the exemplary form shown, the instrument comprises a box-like casing 10 which for convenience in assembly, or for repair purposes includes a main body portion 11 of rectangular cup-shape open at one side and equipped with a closure member or cover 12. The components of the casing or housing 10 may be formed from appropriate light guage sheet metal, the body portion 11 including a front wall 13, opposite spaced side walls 14, a bottom wall 15 and a top wall 17, with the rear side of the body open. The closure member 12 provides the rear wall of the housing and is formed with forwardly turned marginal flanges 18 adapted to fit snugly within the margins of the side, bottom and top walls of the body member defining the rear opening. For securing the closure 12 in place it is provided with one or more attachment ears 19, as for example, on the upper and lower marginal flanges 18, as extensions of said flanges and which are adapted to be secured to the contiguous portions of the body member 11 by means of removable screws 20.

Supporting means in the form of an elongated stem-like handle 21 are provided preferably attached centrally to project downwardly from the bottom wall 15 of the housing. Thereby the device is adapted to be supported in one hand of the user, such as the right hand of the user as shown in Figure 1, grasping the lower portion of the handle 21 and supporting the housing 10 in front of the right eye of the user in position to look with his right eye into the housing through a peephole 22 of generous diameter in the cover member 12 an offset from the vertical axis of the rear cover toward the left side substantially as shown in Figures 2 and 3. The length of the handle 21 is preferably at least six or seven inches so as to permit easy manipulation and support of the instrument with a minimum of fatigue in use, the unreduced scale of Figure 2 showing a commercially practical form of the device in substantially its actual size.

Within the housing 10 a sensitively adjustable optical system 23 directs through the opening 22 to the eye of the user light from a selected target admitted through an opening 24 in the front wall 13 of the casing body and disposed in offset relation to the rear wall opening 22 to the right side of the front wall vertical axis. By preference the light admitting opening 24 is vertically elongated as best seen in Figures 1 and 2. In an inexpensive, light weight and effective structure the optical system 23 comprises a mirror 25 disposed operatively to receive the light from the target image entering by way of the opening 24 and reflect the light onto a second mirror 27 which in turn reflects the light from the image on through the peephole 22. Both of the mirrors may be simple plain mirrors having the reflective faces disposed in proper angular relation to the respective opening and toward each other and spaced from each other to effectuate the described functions and with the usual opaque backings of the mirrors facing outwardly relative to the optical system and away from the respective apertures in the housing.

Means are provided for supporting the mirrors 25 and 27 for minute incremental adjustment of the reflecting face angles thereof relative to one another and to the respective light axes of the associated housing apertures. To this end, each of the mirrors (Figures 2 and 6) is carried by supporting pivot bracket members 28 and 29 attached to respectively the upper and lower edges of the respective mirrors and constructed and arranged to maintain the mirrors vertically in pivotal, cushioned, or shock-proof relation within the housing 10.

Each of the upper mirror retaining and pivot members 28 comprises a grooved or channel shape body portion 30 engaging the upper margin of the mirror near one end thereof embracingly within the channel and preferably cemented in place so as to hold the mirror against displacement in its plane from the retainer. A spring arm 31 projects from the inner end of the body portion 30 along the adjacent edge of the mirror and is angled or bowed progressively away from the mirror edge so that the extremity portion of the arm is spaced a substantial distance from the mirror. A pivotal connection with the upper wall 17 of the housing is effected between each of the spring arms 31 by means of a pivot lug or flange 32 extending upwardly therefrom into a respective bearing aperture 33 in the housing top wall. It will be observed that the spring arms 31 of the respective retainer bracket members 28 are directed in respectively opposite directions on the respective mirrors, and the pivots for the upper brackets are located adjacent to the respective light apertures with which the mirrors are respectively directly associated. In other words, the pivot 32 for the mirror 25 is located on the upper wall 17 adjacent to the aperture 24, while the mirror pivot 32 for the mirror 27 is located adjacent to the aperture 22.

The lower supporting brackets 29 are of substantially similar construction to the upper brackets. Each of the lower supporting bracket members comprises a grooved or generally channel-shaped body portion 34 embracing the lower margin of the respective mirror adjacent to the same end of the lower margin as the body portions 30 of the upper brackets embrace the upper margins of the mirrors and the engaging body portions 34 are preferably permanently attached to the mirrors as by cementing, as indicated at 35 in Figure 4. Extending from each of the body portions 34 is an elongated spring arm 37 which is angled or bowed away from the edge of the mirror progressively and terminates in a downwardly directed pivot lug or flange terminal 38. The respective pivots 38 are pivotally engaged in appropriate bearing apertures 39 in the lower wall 15 of the housing (Figures 3 and 5). The pivots 38 are coaxially aligned with the upper pivots 33 so that the respective mirrors will swing about vertical axes through the pivots. It will be observed that by reason of the inherent resilience of the spring arms 37, assembly of the mirrors within the housing is substantially facilitated, the spring arms being stressed toward the adjacent edges of the respective mirrors sufficient to clear the pivots for movement into position with respective pivot aperture. The spring arms 31 are then allowed to spring out into engagement with the adjacent opposing walls of the housing with the respective pivots in the bearing apertures. Since the spring arms work resiliently in opposition to one another, the mirrors are supported edgewise in resilient substantially shock proof relation in service.

Relative pivoting of the mirrors 25 and 27 is effected quite efficiently from a position externally of the housing 10 in a manner which avoids vibrations or distortions of the visual axis utilizing the optical system 23 and without aberrations in the light reflective path afforded by the mirrors 25 and 27. To this end, a tubular operating member 40 is freely slidably mounted about the upper end of the handle 21, both of which for this purpose are cylindrical in form. The tubular operating member 40 is substantially shorter than the handle 21 and is suitably maintained with its upper end adjacent to the underside of the lower wall 15 of the housing. Means for maintaining the tubular member 40 releasably in such position herein comprises a screw 41 which is threaded into the handle 21 below the lower end of the tubular member 40 and may be removed when it is desired to drop the tubular operator 40 to effect disengagement thereof from the mirror actuating mechanism. Means comprising a knurled collar 42 may be provided on the lower end portion of the tubular member 44 for convenience in engaging and operating the tubular member 40 manually in the manner indicated in Figure 1 wherein the left hand of the operator is shown in position to turn the tubular member 40 as desired.

Extending upwardly from the upper end of the tubular operator 40 is a narrow integral post or pin projection 43 which extends as a finger up through an elongated clearance slot 44 in the bottom wall 15 of the housing affording a predetermined range of rotary oscillatory turning of the tubular operator 40 limited by the length of the slot 44. It will be observed that in this manner the pin or finger 43 has a range of movement eccentric to the axis of the handle 21.

As best seen in Figures 4 and 5, the finger 43 extends substantially above the lower wall 15 of the housing and into engagement with a mirror-actuating link member 45. In the present instance the member 45 comprises a plate having an aperture 47 therein into which the finger 43 extends. The plate lies parallel to and above the housing bottom wall 15 and has at opposite edges upstanding post or pin-like fingers 48 providing actuating pivots engaging in respective pivot bearing apertures 49 in lateral flanges 50 on the adjacent opposing inner leg portions of the supporting bracket bodies 34 of the lower bracket members 29. To provide for lost motion in the relative movement of the actuating finger 43 and the link plate 45, the slot 47 is somewhat elongated radially to the axis of the actuating tube 40. Through this arrangement, as the tube 40 is rotated in either direction within the limits permitted by the clearance slot 44 in the housing bottom wall 15, movement of the actuating link plate 45 relative to the mirrors 25 and 27 is effected by swinging of the plate 45 about an axis defined between the triangularly related post or pin members 43 and 48. This triangular relationship is best seen in Figure 3. By having the actuated pivots disposed as particularly shown, minute incremental swinging of the mirrors 25 and 27 is accomplished by the simple leverage system disclosed. Yet, the range of relative swinging movement of the mirrors is ample to take care of all angular adjustments that may be required in service.

Underlying the lower supporting bracket flanges 50, the link plate 45 may be provided with return bent parallel spacer fingers 51 which assure that the link plate 45 will remain close to the bottom wall 15 of the housing and not be displaced undesirably relative to the actuating finger 43.

In use, the mirrors 25 and 27 are adapted to be moved angularly either way relative to a parallel position as shown in full line diagrammatically in Figure 7. That is, by actuation of the actuating tube 40, to motivate the operating linkage connecting the same with the mirrors, the mirrors can be swung into divergent relation or convergent relation with respect to each other, considered from a position at the back of the instrument. The relatively angular divergent and convergent positions are indicated diagrammatically by the dash outline positions of the mirrors in Figure 7. Through this arrangement, a person using the same with the left eye at the axis terminal L and the right eye at the axis terminal R, the left eye viewing the target object O directly and the right eye viewing the target object O through the optical system of the instrument, will at one adjusted setting of the mirrors attain true binocular vision and will see the object as a single object. When the mirrors are relatively angularly swung to relatively divergent condition the object will tend to break toward the outside toward the position indicated at O'. When the mirrors are relatively swung toward convergence of plane the object will appear to break toward the inside, as indicated diagrammatically at O''. This capability of the instrument is fundamental in affording the stimulating and exercising results in the use of the instrument.

Oblique movements of the object are obtainable by tilting the housing. Upon and down displacement of the target object are obtainable by placing the instrument with the operating axis thereof horizontal.

From the foregoing description it will be seen that simple efficient and economical means have been provided whereby the internal visual fields of the brain and the external and internal muscular structures of the eyes may be strengthened and innervated and that the development and ability to see tri-dimensionally is hereby provided for.

It will be understood that modifications and variations may be effected without departing from the scope of the novel concepts of the present invention.

Having described my invention I claim:

1. In an optical instrument of the character described, a supporting structure including a housing defining a chamber, said housing having spaced walls with respective apertures therein laterally offset relative to one another, a pair of mirrors mounted on said supporting structure with the reflective faces of the mirrors disposed in generally offset relation conformable to the offset relation of said apertures but in mutual light-reflecting relation so that an image of a target entering one of said apertures onto one of the mirrors will be reflected to and visible on the other of the mirrors through the other of said apertures, a handle for carrying said supporting structure manually, means for varying the reflecting angle of at least one of said mirrors with respect to the other of said mirrors and including a manually movable member having a portion spaced a substantial distance from the mirrors and manipulable to move relative to the handle while the instrument is held by said handle in position relative to the eye of a user for viewing the image reflected by the mirrors, and an actuated member operatively connecting said manually movable member and the movable mirror and movable relative to the handle by movement of said manually movable member.

2. In combination in an optical instrument of the character described, a housing, said housing having spaced walls, said walls having respective apertures therein in offset relation, a pair of mirrors within the housing and cooperatively disposed to reflect an image entering one of said apertures for visibility through the other of said apertures, a handle on said housing for manually supporting the housing adjacent to the eye of a user for viewing said image, and means for changing the relative angularity of the mirrors while the image is being viewed and comprising a manually manipulable member movable relative to the handle externally of the housing and mechanism movable relative to said member and operably connecting the member to at least one of said mirrors for effecting said change in relative angularity of the mirrors, said member having a manipulating portion thereof disposed at a substantial distance from the housing to avoid hand imposed deviations of the instrument while manipulating said member.

3. In combination in an optical instrument of the character described, a housing, said housing having spaced walls, said walls having respective apertures therein in offset relation, a pair of mirrors within the housing and disposed to reflect an image entering one of said apertures for visibility through the other of said apertures, a handle comprising a stem-like member for supporting said housing adjacent to the eye of a user for viewing the image, and means for varying the angularity of said mirrors comprising a manipulating member carried by said handle and having a relatively movable connection with at least one of said mirrors.

4. In combination in an optical instrument of the character described, a supporting structure, a pair of mirrors optically related to reflect an image from one of the mirrors to the other of the mirrors and being offset so that the image can be viewed by viewing the reflective surface of said other mirror, said mirrors being individually pivotally mounted on parallel axes at respective sides thereof on said supporting structure, a link structure connecting the remaining sides of the mirrors and operative to move the mirrors simultaneously for varying the relative angular disposition of the mirrors, and means for manually actuating said link structure.

5. In combination in an optical instrument of the character described, a housing, a cylindrical handle on said housing, a tubular actuating member encircling the handle adjacent to the housing, a peep hole in one wall of said housing and a light entry hole in the opposite wall of the housing, said holes being offset with respect to one another, an optical system comprising cooperative relatively movable light deflecting members mounted within said housing and cooperable to direct light entering the entry hole through the peep hole, and means connected to said tubular member and to said deflecting members for relatively actuating said deflecting members by rotating the tubular member about said handle to vary the optical axis of said deflecting members relative to said peep hole.

6. In combination in an optical instrument of the character described, a housing, a handle of substantial length for manipulating the housing to support the same in front of the eye of a user, the length of the handle being such as to afford a long lever enabling spontaneous user adjustment for hypo- or hyper-phoric deviations of the instrument before the user's eye, said housing having offset apertures in opposing walls thereof, an optical system comprising relatively movable cooperating light deflecting members within the housing operatively disposed to enable viewing light from a target object entering one of said openings by looking through the other of said openings, and means on said handle having connection with the optical system for relatively moving said deflecting members at the will of the user while the instrument is manually supported by said handle in front of the eye of the user to vary the optical axis of said deflecting members relative to said other opening.

7. In combination in an optical instrument of the character described, a housing, a handle for supporting said housing, a tubular manipulating member encircling the handle relatively rotatably adjacent to the housing, a pair of mirrors disposed in offset light deflecting relation and having pivotal support within the housing, openings in the housing for entry of light to said mirrors and for viewing the light reflected from one mirror to the other mirror, a link stucture connecting said mirrors for pivotally moving the mirrors relatively to vary the optical axis of said mirrors relative to said viewing opening, and means connecting said manipulating member with said link structure to effect mirror pivoting movement responsive to rotation of said member.

8. In combination in an optical instrument of the character described, a housing having a bottom wall and front and rear walls angular to said bottom wall and spaced apart, the rear wall having a peep hole offset from the vertical axis of the rear wall, the front wall having a light entry opening offset from the axis of the front wall to the opposite side from said peep hole, a pair of mirrors respectively angled toward the peep hole and the light entry hole and pivotally connected to said bottom wall adjacent to the respective openings toward which angled, a link member pivotally connected between the adjacent lower portions of the mirrors remote from the respective mirror pivots, a handle depending from said bottom wall, a manipulating member movably mounted on the handle, the bottom wall having an aperture therein, and means extending from said manipulating member through said aperture in the bottom wall and interengaging said link member for moving the link member and thereby pivotally altering the relative angular positions of the mirrors.

9. In combination in an optical instrument of the character described, a generally box-like housing having a bottom wall, front and rear walls and a top wall; the front and rear walls having offset openings therein; a pair of mirrors within said housing having reflecting surfaces directed generally toward one another and said mirrors being disposed respectively adjacent to and facing generally toward respective ones of said openings; supporting brackets attached to the upper and lower margins of said mirrors and having pivots projecting away from the adjacent margins of the mirror upwardly and downwardly and respectively pivotally engaging with the top and bottom walls of the housing, and means for relatively moving the mirrors on their pivots.

10. In combination in an optical instrument of the character described, a generally box-like housing having a bottom wall, front and rear walls and a top wall; the front and rear walls having offset openings therein; a pair of mirrors within said housing having reflecting surfaces directed generally toward one another and said mirrors being disposed respectively adjacent to and facing generally toward respective ones of said openings; supporting brackets attached to the upper and lower margins of said mirrors and having pivots projecting away from the adjacent margins of the mirror upwardly and downwardly and respectively pivotally engaging with the top and bottom walls of the housing; and means for relatively moving the mirrors on their pivots, said means comprising a link pivotally connecting the lower mirror supporting brackets.

11. In combination in a small and compact hand carried and operated instrument adapted for stimulating the optical nerve processes to correct visual fusion deficiencies, a supporting structure including a handle of substantial length and supporting structure mounted at one end of the handle, a pair of mirrors mounted on said supporting structure on parallel axes and in such mutually reflective relation that when the instrument is held by means of the handle in front of one eye of a user a target can be viewed by said eye through the optical system provided by the mirrors while the remaining eye of the user looks freely at the target, and a member having a portion located at a substantial distance from said supporting structure and from said mirrors and freely operatively movable relative to said handle, means operatively connecting said member to at least one of said mirrors for adjusting the mirrors to a visual axis correlated to the visual axis of the free eye of the user for effecting fusion in the brain of the image impressions from both eyes, said movable member being operable through the medium of said portion thereof, while the user continuously views the target, for cyclically effecting said adjustment of the mirrors to converge or diverge the mirrors and thereby divert the visual axis of the mirrors to shift from said fusion the target image as viewed and then to readjust the visual axes, whereby ocular nerve impulses, tending to resist breaking of fusion during cyclical pivoting of the mirrors by said members, stimulate and effect exercise of the ocular muscles, and of the higher centers of the brain which are utilized in effecting binocular vision, the free movement of said member relative to said handle and to said supporting structure and the distance of said portion of the member from said supporting structure and the mirrors permitting relative adjustment of the mirrors without manipulative jarring of the mirrors.

OTTO R. ENGELMANN.

REFERENCES CITED

The following references are of record in the file of this patent:

UNITED STATES PATENTS

| Number | Name | Date |
| --- | --- | --- |
| 921,137 | Michelson | May 11, 1909 |
| 1,908,296 | Ames et al. | May 9, 1933 |
| 2,175,105 | Bryn | Oct. 3, 1939 |
| 2,229,410 | Gulden | Jan. 21, 1941 |

FOREIGN PATENTS

| Number | Country | Date |
| --- | --- | --- |
| 42,567 | France | May 22, 1933 |
| 630,058 | France | Aug. 9, 1927 |
| 24,284 | Great Britain | Dec. 18, 1914 |
| 448,965 | Great Britain | June 18, 1936 |
| 916 | Great Britain | Jan. 14, 1907 |
| 678,342 | Germany | July 13, 1939 |
| 291,634 | Germany | Apr. 29, 1916 |